(12) United States Patent
Shan

(10) Patent No.: US 10,371,241 B1
(45) Date of Patent: Aug. 6, 2019

(54) STRESS-WAVE ACTUATOR AND REDUCER

(71) Applicant: Baoxiang Shan, Hoboken, NJ (US)

(72) Inventor: Baoxiang Shan, Hoboken, NJ (US)

( * ) Notice: Subject to any disclaimer, the term of this patent is extended or adjusted under 35 U.S.C. 154(b) by 0 days.

(21) Appl. No.: 16/139,125

(22) Filed: Sep. 24, 2018

Related U.S. Application Data (60) Provisional application No. 62/688,385, filed on Jun. 22, 2018, provisional application No. 62/735,128, filed on Sep. 23, 2018.

(51) Int. Cl.
 *F16H 49/00* (2006.01)

(52) U.S. Cl.
 CPC ..... *F16H 49/001* (2013.01); *F16H 2049/006* (2013.01)

(58) Field of Classification Search
 CPC .......................... F16H 49/001; F16H 2049/003
 USPC .......................................................... 74/640
 See application file for complete search history.

(56) References Cited

U.S. PATENT DOCUMENTS

| | | | |
|---|---|---|---|
| 2,906,143 A | 9/1959 | Musser | |
| 3,389,274 A | 6/1968 | Robertson | |
| 6,155,220 A | 12/2000 | Marriott | |
| 7,086,309 B2 * | 8/2006 | Stoianovici | F03C 1/04 74/640 |
| 7,673,598 B2 * | 3/2010 | Schaefer | F01L 1/34 123/90.15 |
| 8,061,262 B2 * | 11/2011 | Stoianovici | F01C 1/10 91/491 |

* cited by examiner

*Primary Examiner* — Ha Dinh Ho
(74) *Attorney, Agent, or Firm* — r.r (princeton); Roy Rosser (57) ABSTRACT

A stress-wave actuator is disclosed in which a stressed, elastic member is in frictional contact with a rigid element. A stress altering actuation travels along the elastic element, temporarily and sequentially altering the stress in a portion of it, thereby moving the stressed element relative to the rigid element. When the rigid element is an enclosure, and the elastic member is shaped and sized to be slightly larger in circumference than the enclosure, the elastic member is compressed and stressed. Altering the stress temporally and sequentially in portions of the elastic member causes it to be displaced relative to the rigid member. Stress alteration may be effected by magnetic, electric or physical means depending of the physical nature of the elastic element. The stress wave actuator may be configured to act as a high torque motor, a high gear ratio motion transfer device, and as a clutch.

21 Claims, 7 Drawing Sheets

STRESS-WAVE ACTUATOR AND REDUCER

CROSS-REFERENCE TO RELATED APPLICATIONS

This application claims priority to U.S. Ser. No. 62/688,385 filed Jun. 22, 2018, and to U.S. Ser. No. 62/735,128 filed Sep. 23, 2018, the contents of both of which are fully incorporated herein by reference.

BACKGROUND OF THE INVENTION

(1) Field of the Invention

The invention relates to mechanisms for producing and transmitting motion, and more particularly, to stress-wave activated mechanisms that produce or transmit motion, and which may also function as motors, as gearless reduction transducers, and as clutches.

(2) Description of the Related Art

The technical problems of producing and/or transmitting motion are inherent in the technical fields of mechanical and electro-mechanical engineering. One particular problem is the production of rotary motion; another is the transmission of that rotary motion to provide shafts rotating at a required speed, and capable of supplying power at a required torque when needed.

Transmitting rotary motion at varying speeds has traditionally been accomplished using either belts and pulleys, or using toothed gears, including, but not limited to, planetary gearing. While these solutions have been developed to work well for an extensive range of practical applications, they have their limitations. Pulleys, for instance, are limited by factors such as belt frictional losses, the inertia of the pulleys themselves, and their size. Practical pulley systems, i.e., those having at least 60% or more efficiency, are, therefore, usually limited to gear ratios of 15:1 or less. Toothed gear systems tend to be more efficient, often achieving as much as 90% efficiency of power transmission, but even planetary gearing systems are typically limited to gear ratios of 10:1 or less. Certain applications require, or would benefit from, transmission systems that achieve higher gear ratios, while being more compact, lighter, and more durable. One notable such application was on the Apollo Lunar Rovers, three of which were deployed on the Moon during 1972-73. These electric vehicles were battery powered. Because of the unusual need for a light and compact design, each of the vehicles' four wheels had a 0.25 HP DC motor, capable of operating up to 10,000 rpm. These motors drove the wheels via an unusual device—a harmonic drive—having a gearing ratio of 80:1 so as to deliver adequate torque for lunar conditions.

The harmonic drive, described in detail in, for instance, U.S. Pat. No. 2,906,143, has a number of advantages over more conventional gearing, including, but not limited to, almost no backlash, high compactness, light weight, high gear ratios, high torque capability, and coaxial input and output shafts. It has, therefore, continued to find applications in robotics and space exploration. The drive does, however, have drawbacks, such as, but not limited to, high manufacturing costs, significantly lower efficiency, increased bearing-drag due, in part, to the eccentric drive loading, and a limited number of low ratio gearing options.

What is needed are electro-mechanical motion transmission systems that, for instance, have some or all of the advantages of harmonic drives, but overcome some or all of their deficiencies. It would be even more desirable if such systems may also be adapted to function as motors.

The relevant prior art includes:

U.S. Pat. No. 2,906,143 issued to C. W. Musser on Sep. 29, 1959, entitled "Strain Wave Gearing" that describes a device in which inner and outer concentric gears are brought into mating relationship in a plurality of spaced areas. The areas of mating relationship are propagated forward in a wave described as a strain wave. The strain wave is superimposed on the circumference of one or both of the gears and travels at a rate determined by the rate of application of load to the mechanism.

U.S. Pat. No. 3,389,274 issued to H. J. Robertson on Jun. 18, 1968 entitled "Peristaltic Actuator" that describes a device in which a member of either magnetostrictive or piezoelectric material is excited with a pulsating type signal applied in a particular sequence. The filed is applied along the length of the material. Portions of the material either expand or contract in the directional sequence and cause a peristaltic type movement of the member relative to another member that it is in frictional contact with.

U.S. Pat. No. 6,155,220 issued to Marriott on Dec. 5, 2000 entitled "Piezoelectric differential cam phase" that describes a compact cam phaser that has a flexible spline deformed into a nonround shape and engaging a mating ring gear or circular member at angularly spaced locations for transferring camshaft drive torque between them. The spline has projecting lobes with teeth or friction surfaces which engage like surfaces formed on the mating gear or member. The spline and ring gear have a differential length or number of teeth. The phaser includes a plurality of angularly spaced radial piezo actuators, which expand and contract to cause the projecting lobes (but not the flexible spline itself) to travel around the circular ring gear in rotating waves. Thus, each point of the flexible spline is moved sequentially into and out of contact with the ring gear as the contact points (lobes) rotate in waves. Since the number of spline teeth differs from the ring gear, one revolution of the waves causes the spline to move relative to the ring gear a number of teeth equal to the differential. The phase angle of the flexible spline relative to the ring gear, and the camshaft relative to the crankshaft, is thus changed by an amount proportional to the revolutions of the waves. The piezo actuators are controlled in known manner by the application and withdrawal of electric voltage which causes the actuators to alternately expand and contract, driving the wave rotation of the spline lobes rapidly to change the phase angle. Various embodiments are disclosed.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive stress-wave actuator is disclosed.

In a preferred embodiment, a stressed, elastic member has one surface that is at least partially in contact with a rigid element. One or more stress altering elements may then temporarily, and sequentially, alter the stress in portions of the stressed, elastic member. As the wave of stress alteration travels along the stressed element, the stressed element may move relative to the rigid element it is in contact with.

In one, preferred embodiment of the invention, the rigid element may form an enclosure. The elastic member may be shaped and sized to be slightly larger in circumference than the enclosure of the rigid element. When situated within the enclosure, the outer surface of the elastic member may be in contact with the inner surface of the enclose, but may be compressed and, therefore, under stress. By sequentially altering the stress in a portion of the elastic member in a vicinity of the contact between the surfaces, the surfaces may be made to be displaced, or move, relative to each other.

In one specific embodiment of the present invention, the rigid element may be a rigid outer structure that may be an enclosure having a right cylindrical shape. The stressed elastic member may be an inner structure, such as, but not limited to, an elastic tube. The inner structure may have an outer perimeter that is greater in length than the perimeter of the cylindrical shape, so that when the inner structure is contained within the outer structure, a compression stress may be induced within the inner structure.

Depending on the material nature of the stressed, inner structure, different methods may be used to alter that stress in a local region.

For instance, in one embodiment, the inner structure may be a tubular, elastic member made of a ferromagnetic material. The stress altering element may then be a magnet. The magnet may alter the stress in a region of the ferromagnetic tube by attracting a local region of the tube inwards it, thereby allowing a temporary, slight buckle to form. If the stress in the elastic member is less than a critical stress, when the magnetic attraction is removed, the buckle will snap back against the outer container. The magnet may, therefore, be moved around the perimeter of the inner surface, which may cause the temporary buckle to also move and, as discussed in detail below, as the two surfaces re-contact each other, the surfaces will be slightly displaced relative to each other. One or more magnets may be on a drive shaft, and may be arranged such that, when they are rotated by one revolution about an axis of the right circular cylindrical shape, the inner structure may also be rotated, but only by a small amount, that may be proportional to, or equal to, a difference between the perimeters of the inner and outer structures. The drive structure may also be functionally connected to an input shaft, and the inner structure may be functionally connected to an output shaft. Such an arrangement may allow the device to function as a gearless reduction unit between the input and output shafts.

In an alternate, exemplary embodiment, the inner structure may be a tubular elastic member made of an electro-active material. This may be activated in a localized region by suitable application of an electric current or voltage. The localized, activated regions may be made to travel around the perimeter such that the inner structure may rotate with respect to the outer structure. The inner structure may be functionally connected to an output shaft such that the stress-wave actuator functions as an electric motor.

In the examples above, the induced stress may be less than a critical buckling stress. In further embodiments, the induced stress may be greater than the critical buckling stress, resulting in the inner structure deforming to a shape that may include one or more buckles. In such embodiments, stress in the inner structure may be altered by one or more buckle drive elements. These buckle drive elements may, for instance, be rollers that mechanically separate a portion of the buckle from the inner surface of the rigid element. The buckle drive elements may be functionally connected to a drive shaft, and the buckled, inner structure may be functionally connected to an output shaft. Such an arrangement may allow the stress wave device to function as a gearless reduction unit between the drive shaft and the output shaft.

In the examples above, the outer element has been assumed to be rigid, and the inner element to be an elastic element that, because of its initial greater circumference, may be under a compression stress when enclosed within the outer structure. For many of the examples above, analogous devices may, instead, be constructed in which the inner structure may be the rigid structure, and the outer structure may be the elastic element. In such devices, the outer elastic structure may have a smaller initial circumference than the rigid inner structure, so that when the outer elastic structure encloses the inner rigid structure, the outer elastic structure may be stretched and, therefore, stressed.

These, and related embodiments of the invention, are described in greater detail below. Therefore, the present invention succeeds in conferring the following, and others not mentioned, desirable and useful benefits and objectives.

It is an object of the present invention to provide a compact, high torque, high gearing ratio mechanical rotation transfer device.

It is a further object of the invention to provide compact, high torque, high gearing ratio mechanical rotation transfer device having an integral electrically operated clutch.

It is another object of the present invention to provide a compact, high torque, electrically activated motor.

BRIEF DESCRIPTION OF THE SEVERAL VIEWS OF THE DRAWINGS

FIG. 2 A shows a schematic cross-section of a further embodiment of a stress-wave actuator of the present invention.

FIG. 2 B shows a schematic cross-section of another embodiment of a stress-wave actuator of the present invention.

FIG. 3 A is a diagrammatic representation of the functioning of a portion of a stress-wave actuator, showing the surfaces in a detached state.

FIG. 3 B is a diagrammatic representation of the functioning of a portion of a stress-wave actuator, showing the surfaces being reattached.

FIG. 4 A shows a schematic cross-section of a stress-wave actuator of one embodiment of the present invention.

FIG. 4 B shows a schematic cross-section of a stress-wave actuator having piezoelectric activators of one embodiment of the present invention.

DETAILED DESCRIPTION OF THE INVENTION

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto without departing from the spirit of the invention.

Figure 1:
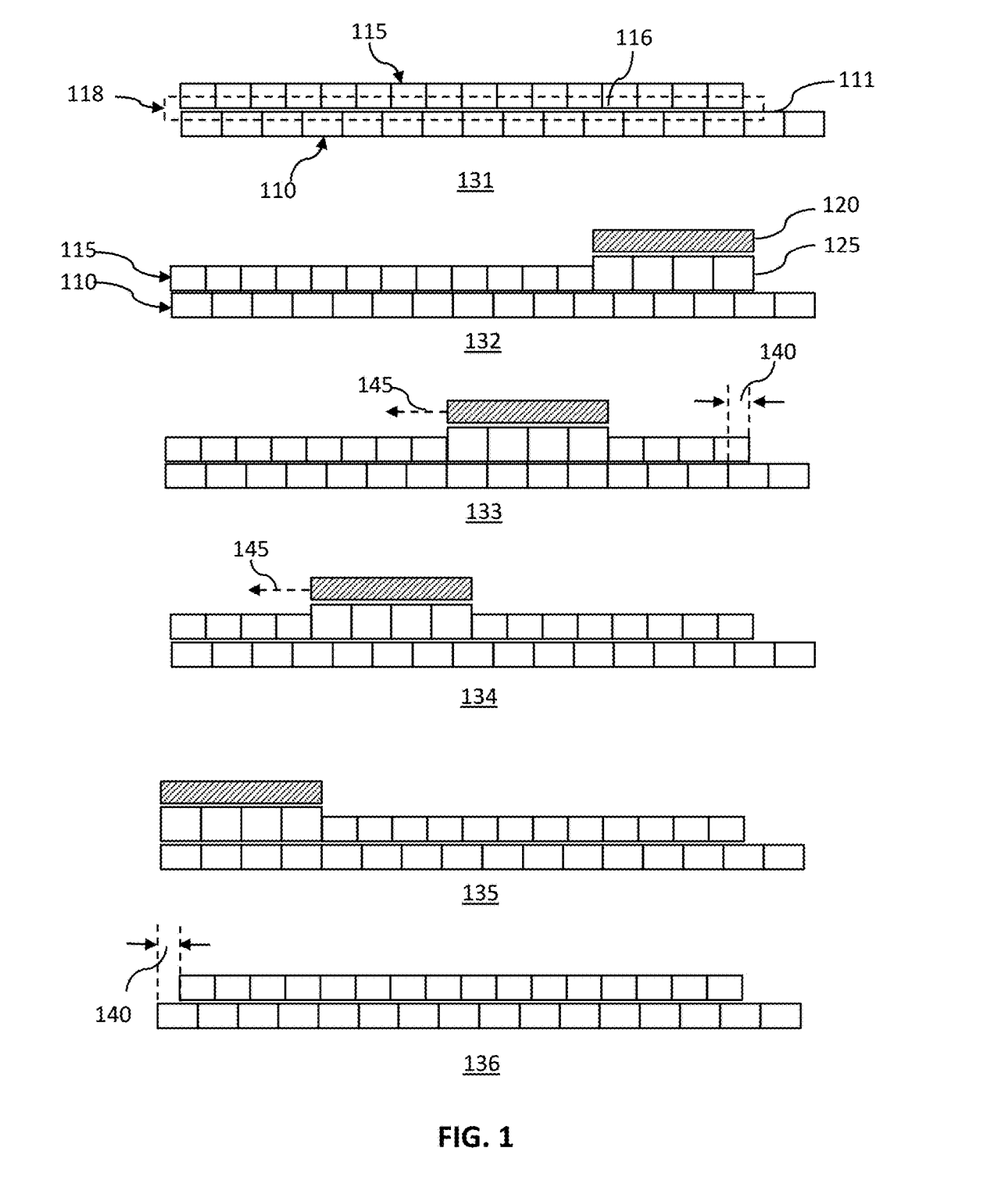
FIG. 1 shows a series of schematic views of a stress-wave actuator of one embodiment of the present invention at various stages of activation.

FIG. 1 shows a series of schematic views of a stress-wave actuator of one embodiment of the present invention at various stages of activation.

The views in FIG. 1 schematically illustrate six stages of a compression stressed, elastic member 115 being moved past a rigid element 110 by a stress altering element 120.

In the region 118, the surface 116 of the elastic member and the surface 111 of the rigid element may be in frictional contact. The frictional forces of the contact may be sufficient to maintain the compression stresses in the elastic element. Stress may then be altered, or relieved, in a localized portion of the elastic member by altering by, for instance, reducing, or eliminating, the frictional forces in that localized portion. This may be accomplished by, for instance, separating the surfaces in that localized portion. The localized separation may be achieved using a physical element such as, but not limited to, a rolling or sliding bar, a sliding wedge, one or more piezoelectric elements, or some combination thereof. Or, if the stressed, elastic member 115 is a ferromagnetic material, the stress altering element 120 may be a magnet, such as, but not limited to, a permeant magnet or an electromagnet. If the elastic member 115 is an electroactive material, the stress altering element 120 may be an application of a voltage or an electric current in the localized region.

Configuration 131 is an initial configuration showing a rigid element 110 in contact with a compression stressed, elastic member 115. In a region 118, a first, upper surface 111 of the rigid element 110 may be in contact with a second, lower surface 116 of the compression stressed, elastic member 115. The elastic member 115 may, for instance, be stressed by a mechanical constraint (not shown in FIG. 1), or it may be pre-stressed, and held in stress by the frictional contact forces, or some combination thereof.

In configuration 132, a stress altering element 120 may be brought into proximity with a region of the compression stressed, elastic member 115, resulting in stress being altered, by for instance being reduced, in a portion 125 of the stressed elastic member. The release of stress may, for instance, be the result of a slight separation of the surfaces in the vicinity of the stress reduction element. The alteration, or release, of stress may, for instance, result in the portion of said stressed elastic member 125 expanding in size. The nature of the stress altering element may depend on the nature of the elastic member. For instance, if the elastic member is a ferromagnetic material, the stress altering element may be a magnet that may attract a portion of the stressed elastic member 125 away from the rigid element 110, thereby allowing that less stressed region to expand and be displaced along the surface 111 of the rigid element.

Alternately, if the elastic member is an electroactive material, the stress altering element may apply a suitable voltage, or electric current, to the portion 125 of the stressed elastic member. The applied voltage, or current, may, for instance, allow that region to be altered by being less stressed and to, therefore, expand. In expanding, there may be a slight buckling, resulting in a slight separation of the surfaces and a local release of stress. As the stress alteration travels along the elastic member, and the surfaces re-contact, they may be slightly displaced with respect to each other.

In a further embodiment, the stress altering element may be a mechanical component such as, but not limited to, a roller that may physically separate the two surfaces in a vicinity of a portion of the stressed elastic member 125. The separation may then allow that portion of the stressed, elastic member 115 to expand as the stress is released, and be displaced along the first surface 111 of the rigid element when the surfaces reconnect.

In configuration 133, the stress altering element is shown having travelled in a direction 145, resulting in the portion of the stressed elastic member in which the stress is being temporarily removed, also travelling in that direction. As a result, the portion that was previously de-stressed may now become re-attached to the surface of the rigid element, but now displaced by a distance 140. The reattached portion may also once again be stressed.

Configuration 134 shows the stress altering element activated at a position further along the compression stressed, elastic member in the direction 145.

In configuration 135, the stress altering element, and the resultant stress relieved portion of elastic member, are shown at the extreme end of the elastic member.

Configuration 136 shows the rigid element and the compression stressed, elastic member after the stress altering element is no longer activating any portion of the stressed, elastic member. The result shown in FIG. 1 is that the compression stressed, elastic member has been moved by a displacement distance 140 with respect to the rigid element.

Figure 2A:
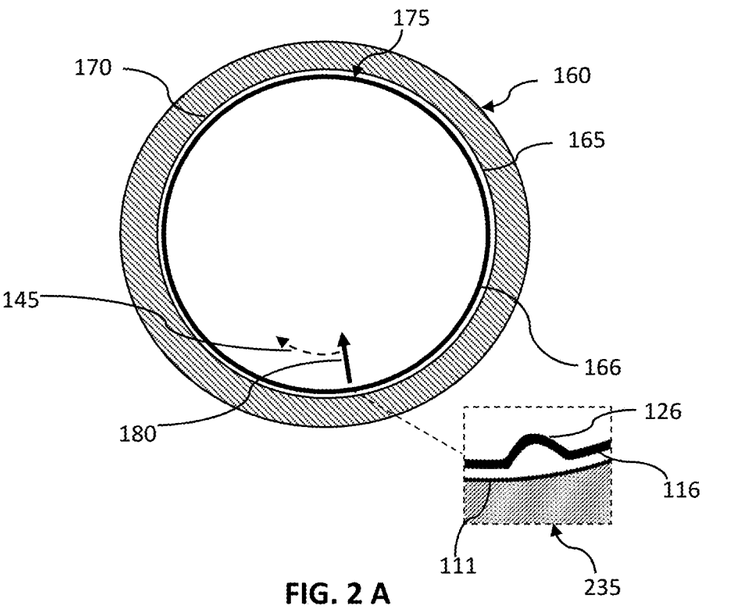

FIG. 2A shows a schematic cross-section of a further embodiment of a stress-wave actuator of the present invention.

In FIG. 2A, a rigid outer structure 160 is shown containing an inner structure 175. The rigid outer structure 160 is shown having a right cylindrical cavity 170 with a perimeter 165. The inner structure 175 that may, for instance, be an elastic tube, is shown having a second, outer perimeter 166. In a preferred embodiment of the present invention, the second, outer perimeter 166 of the inner structure may, in an uncompressed state, be longer than the first perimeter 165 of the rigid outer structure. As a result of the difference in perimeters, the elastic, inner structure may be compressed when it is contained within the outer structure and, therefore, be stressed.

Also shown schematically in FIG. 2 is a stress altering actuation 180 force that may be provided by a stress altering element. The stress altering actuation 180 force may be moved around the perimeter of the inner structure in a direction 145, or there may be multiple stress altering actuation forces that may each be applied temporarily, and sequentially.

FIG. 2A also shows the localized region 235 in greater detail. This may be the region affected by the stress altering actuation. As shown, a part of the second surface 116 of the inner structure may be the portion 126 that may be temporarily detached from the surface 111 of the rigid structure's cylindrical opening. As the stress altering actuation 180 force, which may be a stress reduction, travels around the perimeter, the slight buckle, that may be a less stressed, temporarily detached portion 126, may also travel around the perimeter. As the portions that were temporarily detached become reattached, they may do so slightly displaced with respect to the first surface 111 from where they were before they were detached.

In this way, the inner structure 175 may be gradually moved with respect to the rigid outer structure 160 so that by the time the stress altering actuation 180 has traveled through 360 degrees, the structures will have moved with respect to each other by an amount proportional to, or even equal to, a difference between the perimeter of the right cylindrical cavity 170 and the perimeter of the elastic inner structure 175 before it was compressed.

Figure 2B:
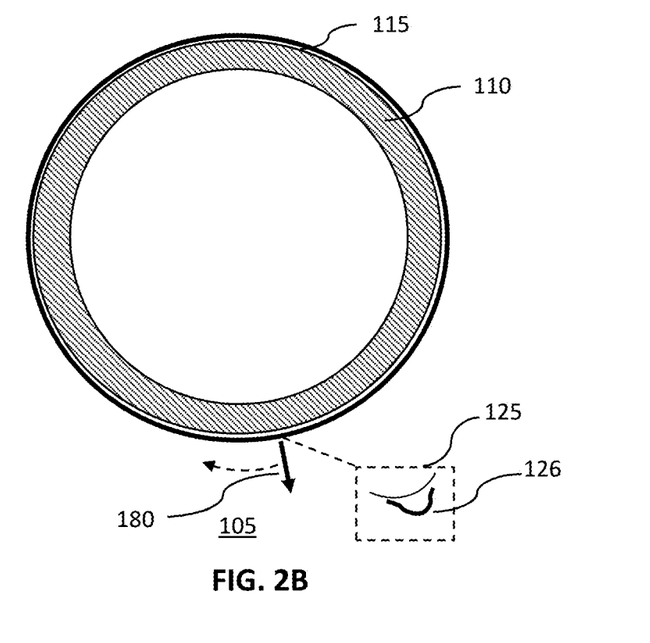

FIG. 2 B shows a schematic cross-section of another embodiment of a stress-wave actuator 105 of the present invention.

In the embodiment shown in FIG. 2 B, the stressed, elastic member 115 may be situated externally to the rigid element 110. The stressed, elastic member 115 may, for instance, have an unstressed circumference that may be slightly smaller than the circumference of the rigid element 110. When the elastic member 115 encloses the rigid element 110, the elastic member 115 may be stretched, and, therefore, be stressed. In such an embodiment, the stress altering actuation force 180 may act outwardly from a center of the rigid element. As shown in the lead out, there may be a temporarily detached portion 126 that may also form outwardly from the portion of stressed elastic member 125 at which the stress altering actuation force 180 may be present.

As with the embodiment shown previously in FIG. 2 A, as the stress altering actuation force 180 travels around the circumference, the stressed, elastic member 115 may be gradually moved with respect to the rigid element 110 so that by the time the stress altering actuation 180 has travelled through 360 degrees, the structures will have moved with respect to each other by an amount proportional to, or even equal to, a difference between their unstressed perimeters.

Figure 3A:
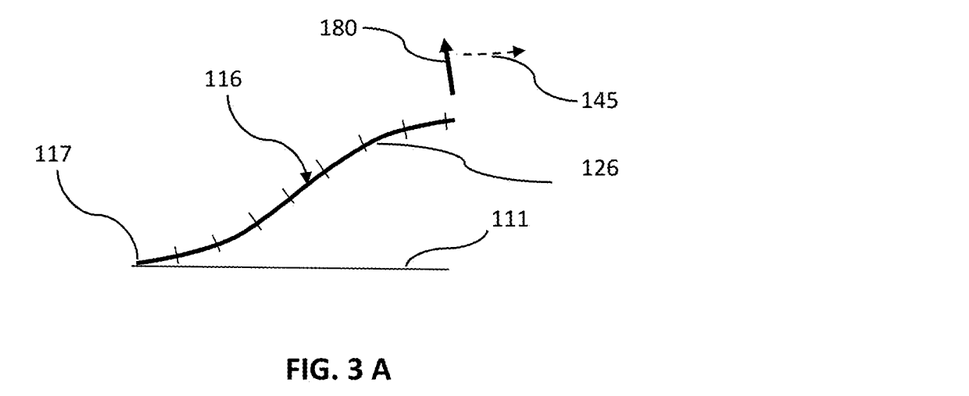

FIG. 3 A is a diagrammatic representation of the functioning of a portion of a stress-wave actuator, showing the surfaces in a detached state.

As shown in FIG. 3 A, a portion 126 of the surface 116 of the elastic element may be temporarily detached from the surface 111 of the rigid element. This detachment may be effected by a stress altering actuation 180 force travelling in a direction 145. The temporarily detached portion 126 may, for instance, become unstressed, and may expand away from a point 117. The point 117 may, for instance, be where the two surfaces may still be held locked in frictional contact with each other.

Figure 3B:
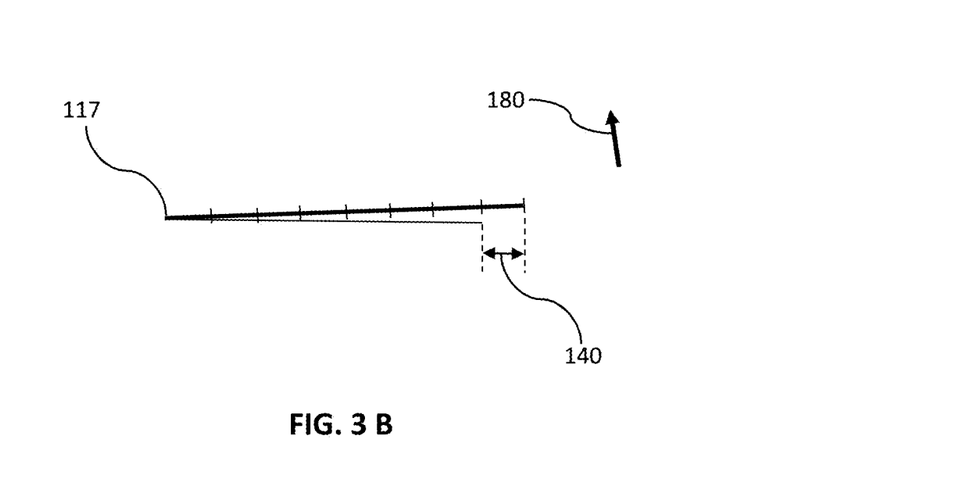

FIG. 3 B is a diagrammatic representation of the functioning of a portion of a stress-wave actuator, showing the surfaces becoming reattached.

As the stress altering actuation 180 is moved away, the second surface may become reattached to the first surface. However, as the point 117 may have remained in contact between the two surfaces, the other end of the second surface may now be reattached displaced by a distance 140 with respect to the first surface.

Figure 4A:
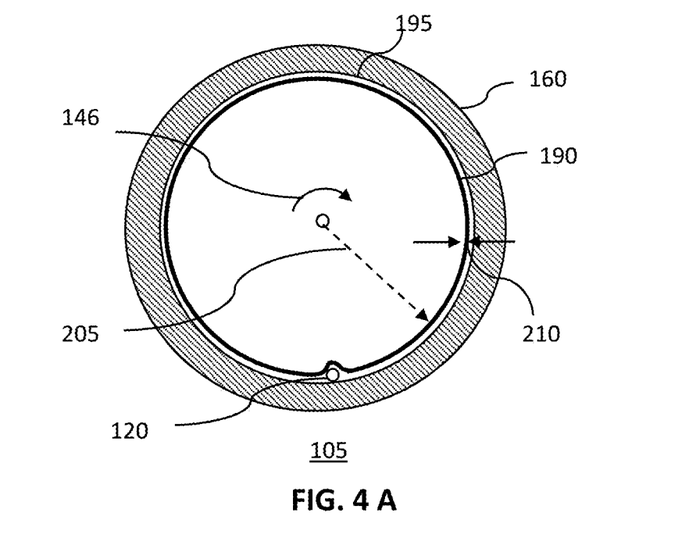

FIG. 4 A shows a schematic cross-section of a stress-wave actuator 105 of one, exemplary embodiment of the present invention.

A rigid outer structure 160 having a right circular cylindrical cavity 195 may contain a hollow elastic tube 190. The hollow elastic tube 190 may have a uniform wall of a thickness 210, and a radius 205. The hollow elastic tube 190 may have an uncompressed perimeter that may be larger than the perimeter of the right circular cylindrical opening. When contained within the right circular cylindrical cavity 195, the hollow elastic tube 190 may, therefore, be in a state of stressed compression.

The tube may have a wall thickness is more than a quarter of the difference between the outer perimeter of the elastic tube 190 and the inner perimeter of the rigid element 195, and the induced stress may, therefore, be less than a critical buckling stress.

An effective, stress altering element 120 may, for instance, be a roller. The roller may, for instance, be inserted between the outer surface of the hollow elastic tube 190, and the inner surface of the right circular cylindrical cavity 195. When so inserted, the roller may temporarily, and locally, alter the stress in the hollow elastic tube 190 in the portion that it has displaced out of contact with the rigid outer structure 160. By moving the stress altering element 120 around the perimeter of the right circular cylindrical cavity 195, a stress wave may be propagated round the perimeter. The moving stress wave may cause the hollow elastic tube 190 rotate in the direction 146 relative to rigid outer structure 160. This relative motion may occur due to mechanisms described in more detail in connection with FIGS. 1, 2 A, 3 A and 3 B.

Figure 4B:
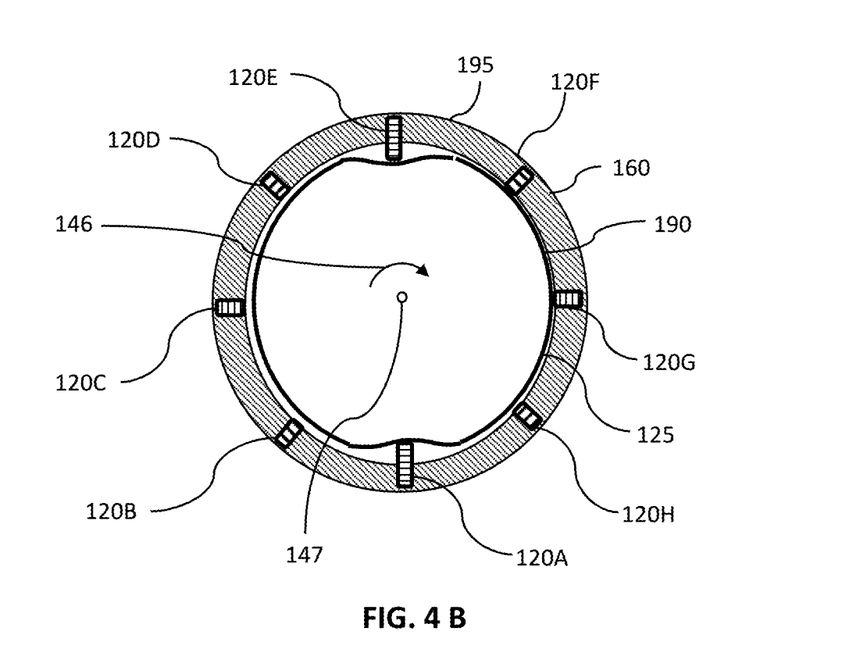

FIG. 4 B shows a schematic cross-section of a stress-wave actuator having piezoelectric activators of one embodiment of the present invention.

As shown in FIG. 4 B, in such an embodiment, the inner elastic structure 190 may be actuated by piezoelectric elements 120 A-H. These stress altering, or actuation, elements 120 may be installed inside the rigid structure 160 along the radial directions of the inner cylindrical surface 195, and equally-spaced along the circumference of the inner cylindrical surface 195. The stress altering, or actuation, elements 120 may be individually activated by applying a suitable electric signal that may be a suitable electric current or electric voltage.

The stress altering, or actuation, elements 120 may, for instance, be actuated temporarily and sequentially from A to H, i.e., element 120 A may be temporarily actuated followed by element 120 B being temporarily actuated and so. When the stress altering element 120 are activated in such a manner, the inner elastic structure 190 may rotate about the central axis 147 of the inner cylindrical surface 195 in the direction 146.

However, when the stress altering, or actuation, elements 120 are actuated temporarily and sequentially from H to A, the inner elastic structure 190 may rotate about the central axis 147 of the inner cylindrical surface 195 in the reverse direction, i.e., opposite to the direction 146.

The stress altering, or actuation, element 120 may also be activated in pairs, or other groupings. For instance, in FIG. 4 B, stress altering element 120 A and E are shown being activated concurrently. Such concurrent, or simultaneous, actuation of pairs of stress altering elements 120 in sequence may double the rotational speed of the inner structure 190 compared to the case in which the stress altering elements 120 are actuated individually in sequence. The electric signals may also be applied sequentially and temporarily to groups of three, or more, of the stress altering, actuation elements 120 A-H, so that the rotating speed of the inner elastic structure 195 may be increased further.

Although the device shown schematically in FIG. 4 B is described as having piezoelectric actuators, any suitable linear actuator may be used such as, but not limited to, an electrostrictive linear actuator, a magnetostrictive actuator, an electro-active polymer (EAP) linear actuators, or some combination thereof.

Figure 5:
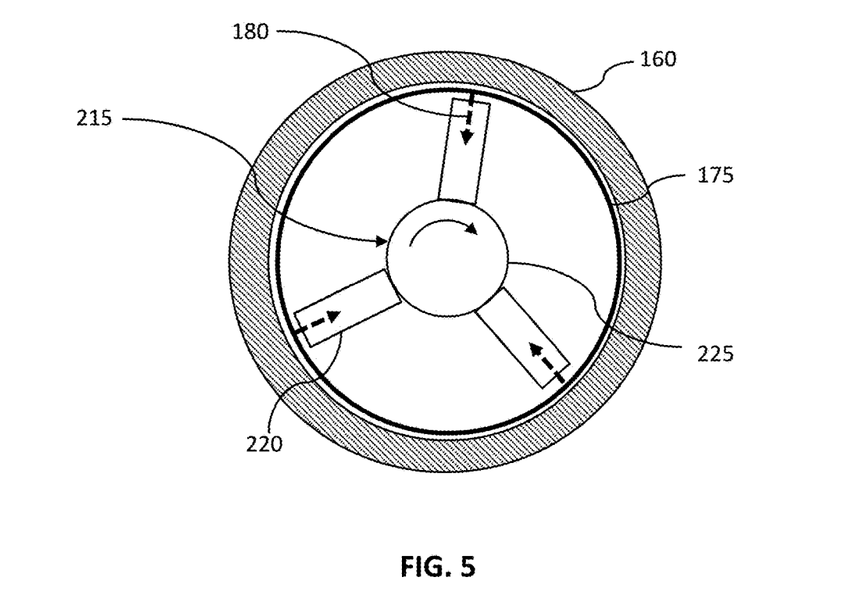
FIG. 5 shows a schematic cross-section of a magnetically activated stress-wave actuator of one embodiment of the present invention.

FIG. 5 shows a schematic cross-section of a magnetically activated stress-wave actuator of one embodiment of the present invention.

As shown in FIG. 5, the rigid outer structure 160 may enclose an inner structure 175 that may be made of a paramagnetic material. The inner structure 175 may be under stress by virtue of having an uncontained perimeter that is slightly larger than the perimeter of the enclosing cavity of the rigid outer structure. In a preferred embodiment, the perimeters may be selected such that the induced stress in the inner structure is less than a critical stress, i.e., the inner structure will not buckle spontaneously. Furthermore, if a slight buckle is formed by an external force, when the force is removed, the inner structure may resume its compression stressed, but unbuckled state.

The stress-wave actuator may also include one or more magnets 220 that may be located proximate to an inner surface of the inner structure. Each magnet may provide a stress altering actuation force 180 in a portion of the ferromagnetic inner structure 175. The stress altering actuation force 180 may, for instance, be caused by the magnet attracting a portion of the elastic inner structure 175 towards it, thereby forming a slight buckle in the inner structure. In the slight buckle, the outer surface of the elastic inner structure may become temporarily detached from the inner surface of the rigid outer structure 160. The elastic inner structure may become less stressed in the detached portion as it expands slightly. As the magnet is moved round the perimeter, the location of the slight buckle will also move. At the leading edge of the moving buckle, the surfaces will be becoming detached, while at the trailing edge, the surfaces will be becoming re-attached. However, as discussed above in more detail, when the surfaces become re-attached, they will do so displaced a small amount relative to each other. The amount of the displacement may be proportional to, or even equal to, the difference between the outer perimeter of the elastic inner member 175 in its uncompressed state, and the inner perimeter of the enclosing cavity of the rigid outer element 160.

With such an arrangement, when the magnets are rotated by one revolution about an axis of the right circular cylindrical opening, the inner structure may be rotated about the same axis by an amount that may be proportional to, or equal to, a difference between two perimeters.

Figure 6:
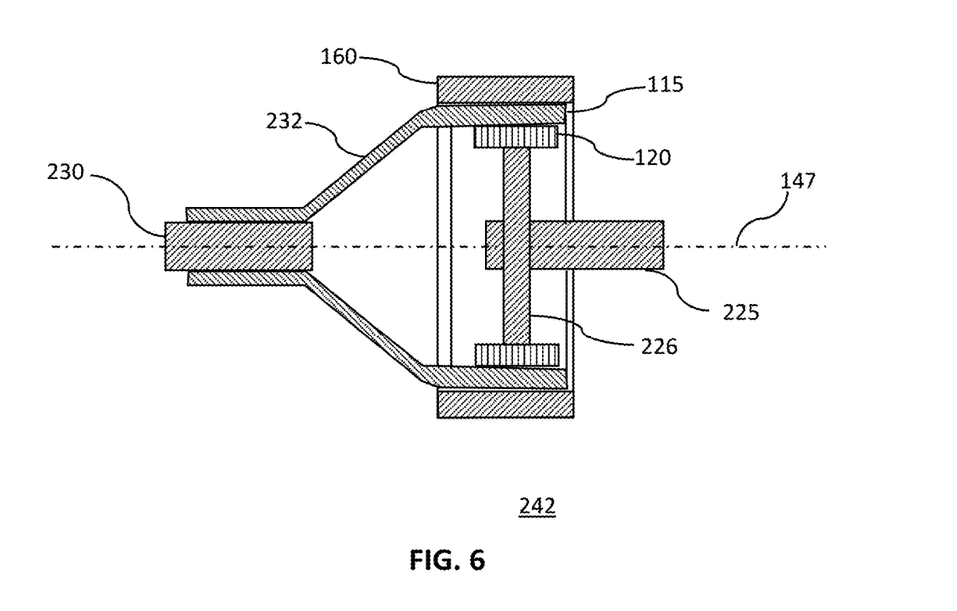
FIG. 6 shows a schematic longitudinal, cross-section of a stress-wave actuator of one embodiment of the present invention configured to operate as a gearless reduction unit.

FIG. 6 shows a schematic longitudinal, cross-section of a stress-wave actuator of one embodiment of the present invention configured to operate as a gearless reduction unit 242.

In the gearless reduction embodiment shown in FIG. 6, the stressed, elastic member 115 contained within the rigid outer structure 160 may be connected to an output shaft by an output-shaft-to-inner-structure connection element 232. The output shaft 230 may be located on a same axis of rotation 147 as an input shaft 225. The input shaft 225 may be connected to one or more stress altering elements 120 via an input-shaft-to-stress-altering element connector 226.

In such an arrangement, each complete revolution of the input shaft 225 may result in the output shaft 230 being rotated by an angle proportional to the difference in perimeter of the inner surface of the rigid outer structure 160, and the perimeter of the compression stressed, elastic member 115, when in its uncompressed state.

In one preferred embodiment of the present invention, the stress altering element 120 may be magnets, and the stressed, elastic member 115 may be, at least in part, made of a ferromagnetic material.

The magnets may be permanent magnets such as, but not limited to, neodymium rare earth magnets, or they may be electromagnets. In the event they are electromagnets, the arrangement shown in FIG. 6 may also act as a combination clutch and reducing drive. For instance, when the electromagnets are not activated, i.e., no current is flowing through them, turning the input shaft 225 will have no effect on the output shaft 230. However, when the electromagnets are activated by having a current flowing through them, turning the input shaft 225 may cause the output shaft to rotate, albeit at a much lower rate of rotation. If the difference in perimeters is x, and the perimeter of the enclosing surface is y, the ratio of the rate of rotation of the output shaft to the rate of rotation of the input shaft will be close to, or equal to x/y. As the difference in perimeters may be of the order of $\frac{1}{100}^{th}$ of the length of the perimeter, very high gearing ratios may be obtained with such devices. As the torque transmission may be close to, or equal to, the inverse of the gearing ratio, very high torque transmissions may be obtained. This may, for instance, allow small motors, or small turning forces, to be used to turn large loads, something that may, for instance, be of considerable use in the field of robotic actuation.

In a further embodiment, the arrangement shown schematically in FIG. 6, may be adapted to be a combination reducing element and clutch when the stress altering element 120 is a permanent magnet, by having a retractable input-shaft-to-stress-altering element connector 226.

In yet a further embodiment of the arrangement shown schematically in FIG. 6, the stressed, elastic member 115 may be made of an electroactive material, or have one or more discrete electroactive electrodes on it. The stress altering element 120 may then be a means of supplying a suitable electrical current or voltage to a portion of the electroactive elastic member. The stress altering element 120 may, for instance, consist of one or more conductive rollers that may be used as electrical contacts.

Figure 7:
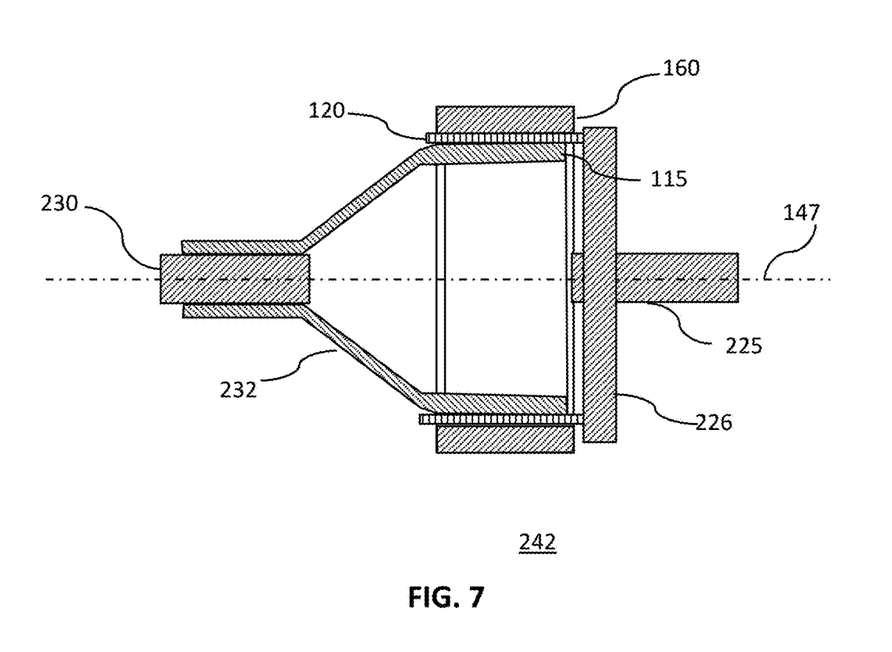
FIG. 7 shows a schematic longitudinal, cross-section of a stress-wave actuator of a further embodiment of the present invention configured to operate as a gearless reduction unit.

FIG. 7 shows a schematic longitudinal, cross-section of a stress-wave actuator of a further embodiment of the present invention configured to operate as a gearless reduction unit.

As shown in FIG. 7, the stress altering element 120 may be a mechanical element such as, but not limited to, a metal roller. The stress altering element 120 may be positioned between the stressed, elastic member 115 and the rigid outer structure 160. The stressed, elastic member 115 may be connected to an output shaft 230 via an output-shaft-to-inner-structure connection element 232. The output-shaft-to-inner-structure connection element 232 may, for instance, have a spoked construction, or have some degree of flexibility, especially where it connects to the compression stressed, elastic member 115. Such arrangements may, for instance, allow the elastic member to flex, but still effectively transmit rotational motion to the output shaft 230. The input shaft 225 may rotate about the same axis of rotation 147 as the output shaft. The input shaft 225 may be connected to the stress altering element 120 by an input-shaft-to-stress-altering-element connector 226.

In such an arrangement, each complete revolution of the input shaft 225 may result in the output shaft 230 being rotated by an angle proportional to the difference in perimeter of the inner surface of the rigid outer structure 160, and the perimeter of the stressed, elastic member 115. The perimeter of the elastic member may be measured when it is in its uncompressed state.

Figure 8:
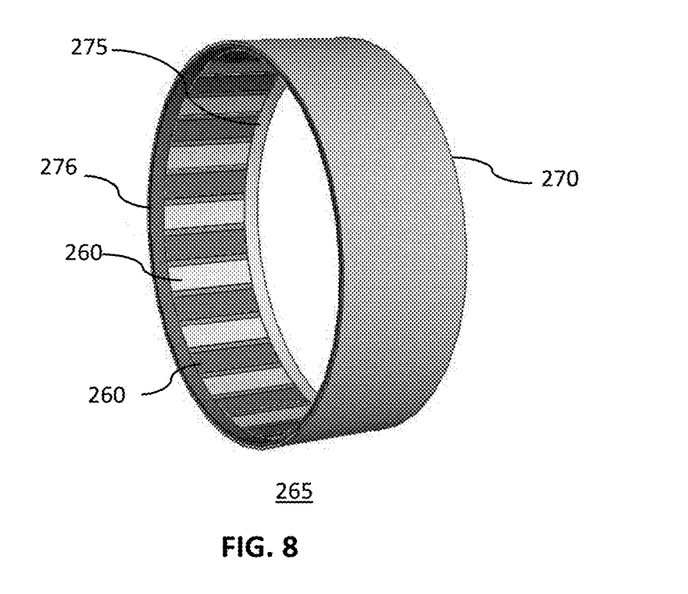
FIG. 8 shows a schematic isometric view of an electro-active loop of one embodiment of the present invention.

FIG. 8 shows a schematic isometric view of an electroactive loop of one embodiment of the present invention.

The electroactive loop 265 may, for instance, be constructed from a loop of flexible conductive material 270 such as, but not limited to, spring steel, aluminum alloy, copper alloy, or titanium, or some combination thereof. The electroactive loop 265 may also have a plurality of segmented electrodes 260 that may act as localized actuators. The segmented electrodes 260 may, for instance, be made of an electroactive material such as, but not limited to, an electroactive polymer, a piezoelectric material, or some combination thereof. The electroactive loop 265 may also have a first external interconnect 275 and a second external interconnect 276. These external interconnects may be insulated from the flexible conductive material 270. The external interconnects may function as electrodes that allow the segmented electrodes 260 to be activated sequentially so that the electroactive loop 265 may be made to rotate when contained in a state of compression stress within a suitable rigid container.

Figure 9:
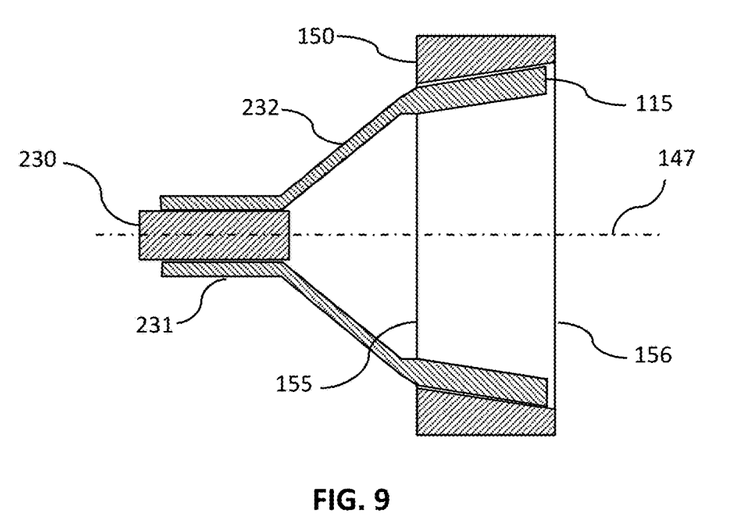
FIG. 9 shows a schematic longitudinal, cross-section of a stress-wave actuator of one embodiment of the present invention configured to operate as a motor.

FIG. 9 shows a schematic longitudinal, cross-section of a stress-wave actuator of one embodiment of the present invention configured to operate as a motor.

The stress-wave actuator may have a rigid enclosure 150 that may have a first open end 155 and a second open end 156. The open ends may not be equal in size, and may of any reasonable shape such as, but not limited to, circular, elliptical, or stadium shaped.

The stressed, elastic member 115 may be made of an electroactive material such as, but not limited to, an electroactive polymer, or it may be an electroactive loop having a construction as described above and shown in FIG. 8. The stressed, elastic member 115 may be connected to an output shaft 230 via an output-shaft-to-inner-structure connection element 232. The connection element 232 may, for instance, have a spoked construction, or have some degree of flexibility, especially where it connects to the compression stressed, elastic member 115. Such an arrangement may, for instance, allow the elastic member to flex, but still effectively transmit rotational motion to the output shaft 230. The connection element 232 may also provide electrical connections to the compression stressed, elastic member 115. These electrical connections, that may include active electronic components, may enable regions of the member to be de-stressed in manner that allow a stress-wave to propagate around its circumference. Such a propagating stress wave may, for instance, move the stressed, elastic member 115 rotationally with respect to the enclosure 150. In such an arrangement, the stress-wave actuator may function as an electric motor that may have a high torque.

Figure 10:
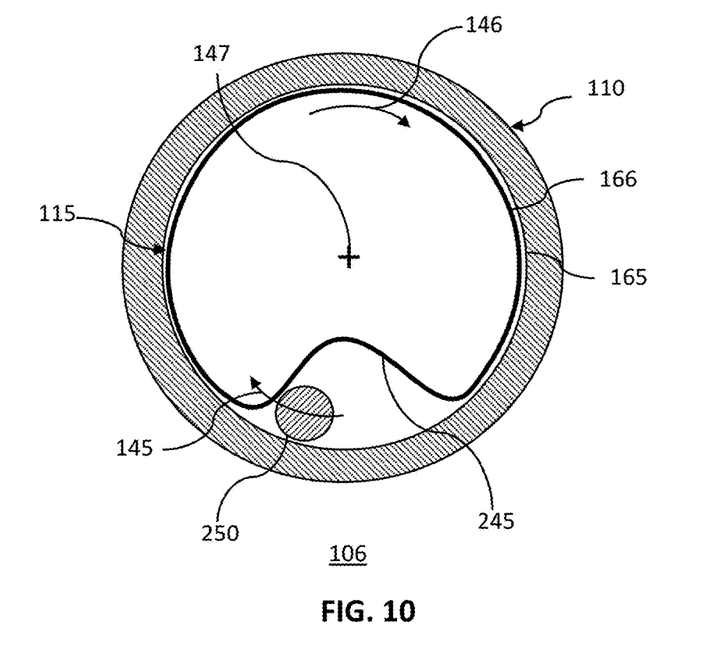
FIG. 10 shows a schematic cross-section of a stress-wave actuator with a buckled region of one embodiment of the present invention.

FIG. 10 shows a schematic cross-section of a stress-wave actuator with a buckled region of one embodiment of the present invention.

In the embodiments described above, the stress-wave actuators 105 had, for the most part, a compression stressed, elastic member in which the stress was less than a critical stress. Any slight buckles formed by any activating forces may, therefore, have only been temporary, and disappeared after the activating force was removed. However, if the stress in the elastic element is greater than a critical stress, then one or more permanent buckles may be formed. FIG. 10 shows a schematic cross-section of a stress-wave actuator 106 having such a buckled region.

The stressed, elastic member 115 contained within the rigid element 110 may be sufficiently stressed that a permanent buckled region 245 may be formed. Such a buckle may be moved by a suitable buckle driving element 250 that may, for instance, be a stress relieving element such as, but not limited to, a metal roller. The buckle driving element 250 may be moved in a direction 145. As the buckle driving element 250 contacts the stressed, elastic member 115 it may separate the member from the inner wall of the rigid element 110, and may, therefore, cause a local change in stress and result in the buckle moving in the direction 146. As the buckle moves, the leading edge may be slightly detached, while at the trailing edge, the elastic element may re-contact the inner surface of the rigid element. However, as detailed above, the re-attachment may occur such that the elastic member is displaced with respect to the rigid element. The amount of the displacement may be proportional to, or even equal to, the difference between the perimeter 165 of the inner surface of the rigid element 110 and the unstressed, outer perimeter 166 of the stressed, elastic member 115. Once the buckle driving element 250 has moved one revolution around the perimeter 165, the stressed, elastic member 115 may, therefore, have rotated by that amount around the axis of rotation 147.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A stress-wave actuator, comprising:
   a rigid element having a first, smooth surface;
   a compression stressed, elastic member having a second, smooth surface, said second surface having at least one region in contact with said first surface; and
   one or more stress altering elements that sequentially and temporarily alter a stress in a portion of said stressed elastic member, thereby displacing said elastic member relative to said rigid element by a first displacement distance.

2. The stress-wave actuator of claim 1, wherein, said stressed, elastic member comprises said one or more stress altering elements.

3. The stress-wave actuator of claim 1, wherein said temporarily altering said stress in said portion of said stressed elastic member results in a part of said second surface in contact with said first surface, becoming a temporarily detached portion, and re-contacting with said second surface, displaced parallel to a direction of said movement of said stress alteration.

4. The stress-wave actuator of claim 1, wherein:
   said first surface of said rigid element forms an enclosure; and,
   said stressed elastic member is contained within said enclosure such that it is compressed, and thereby stressed.

5. The stress-wave actuator of claim 1, wherein:
   said second surface of said stressed, elastic member forms an enclosure; and
   said rigid element is enclosed within said stressed, elastic member, such that said stressed, elastic member is stretched, and, thereby, stressed.

6. The stress-wave actuator of claim 4, wherein:
   said rigid element is a rigid outer structure comprising a right cylindrical cavity having a first perimeter;
   said stressed elastic member is an inner structure having a second, outer perimeter that is greater in length than said first perimeter thereby inducing a stress within inner structure; and,
   said temporarily, and sequentially, applying a stress altering actuation in said portion of said stressed elastic member results in said outer structure being displaced relative to said inner structure by a distance proportional to a difference between said first and second perimeters.

7. The stress-wave actuator of claim 6, wherein said inner structure comprises a hollow elastic tube.

8. The stress-wave actuator of claim 7, wherein, said induced stress is less than a critical buckling stress.

9. The stress-wave actuator of claim 6, wherein,
said inner structure comprises a paramagnetic material; and,
further comprising, a drive structure comprising one or more magnets located proximate to an inner surface of said inner structure, such that, when said magnets are rotated by one revolution about an axis of said right circular cylindrical opening, said inner structure is rotated about said axis by an amount proportional to said difference between said first and second perimeters.

10. The stress-wave actuator of claim 9, wherein, said drive structure is functionally connected to an input shaft; and, said inner structure is functionally connected to an output shaft such that said stress-wave actuator functions as a gearless reduction unit between said input and said output shafts.

11. The stress-wave actuator of claim 9, wherein, at least one of said magnets is a permanent magnet.

12. The stress-wave actuator of claim 9, wherein, at least one of said magnet is an electromagnet, thereby providing a clutch mechanism between said input and output shafts.

13. The stress-wave actuator of claim 6, wherein, said inner structure comprises an electroactive material.

14. The stress-wave actuator of claim 13, wherein, said electroactive material is activated at one or more localized regions.

15. The stress-wave actuator of claim 14, wherein, said activation of said localized regions moves sequentially around said second, outer perimeter such that said inner structure rotates with respect to said outer structure.

16. The stress-wave actuator of claim 15, wherein, said inner structure is functionally connected to an output shaft such that said stress-wave actuator functions as an electric motor.

17. The stress-wave actuator of claim 7, wherein, said buckling stress exceeds a critical buckling stress and said inner structure assumes a shape having one or more buckled regions.

18. The stress-wave actuator of claim 17, wherein,
said right cylindrical cavity is a right circular cylindrical cavity having a first radius;
said inner structure has a uniform wall of a first thickness; and
further comprising a drive shaft functionally connected to one or more buckle driving elements located such that rotation of said buckle drive elements about an axis of said right circular cylindrical by one full rotation causes said inner structure to rotate by an amount proportional to said difference between said first and second perimeters about said axis.

19. The stress-wave actuator of claim 18, wherein, said inner structure is functionally connected to an output shaft such that said stress-wave actuator functions as a gearless reduction unit between said drive shaft and said output shaft.

20. The stress-wave actuator of claim 17, wherein,
said right cylindrical cavity is a right circular cylindrical cavity having a first radius;
said inner structure has a uniform wall of a first thickness and comprises an electroactive material; and,
said electroactive material is activated in a vicinity of one or more of said buckles, thereby causing said inner structure to rotate with respect to said outer structure about and axis of said right circular cylindrical opening.

21. The stress-wave actuator of claim 20, wherein, said inner structure is functionally connected to an output shaft such that said stress-wave actuator functions as an electric motor.

* * * * *